United States Patent
Wakatsuki et al.

(10) Patent No.: US 7,345,293 B2
(45) Date of Patent: Mar. 18, 2008

(54) DEVICE AND METHOD FOR INSPECTING PISTON RING

(75) Inventors: Yasuhiko Wakatsuki, Tokyo (JP); Haruo Tsutsumi, Tokyo (JP)

(73) Assignee: Hirata Corporation, Tokyo (JP)

( * ) Notice: Subject to any disclaimer, the term of this patent is extended or adjusted under 35 U.S.C. 154(b) by 302 days.

(21) Appl. No.: 10/559,450

(22) PCT Filed: Jun. 23, 2003

(86) PCT No.: PCT/JP03/07917

§ 371 (c)(1),
(2), (4) Date: Dec. 5, 2005

(87) PCT Pub. No.: WO2004/113706

PCT Pub. Date: Dec. 29, 2004

(65) Prior Publication Data

US 2006/0131520 A1    Jun. 22, 2006

(51) Int. Cl.
*B23P 15/10* (2006.01)
*G01N 21/86* (2006.01)

(52) U.S. Cl. ............ 250/559.19; 250/559.36; 250/559.37; 29/222

(58) Field of Classification Search ......... 250/559.19–559.49; 29/222
See application file for complete search history.

(56) References Cited

U.S. PATENT DOCUMENTS

| | | | | |
|---|---|---|---|---|
| 4,379,234 A | 4/1983 | Cruz | ........... | 250/559.37 |
| 2004/0194296 A1* | 10/2004 | Kosuge | ........... | 29/714 |

FOREIGN PATENT DOCUMENTS

| | | |
|---|---|---|
| BR | 8202776 | 4/1983 |
| GB | 2 099 142 | 12/1982 |
| JP | 57-194837 | 11/1982 |
| JP | 4-268486 | 9/1992 |
| JP | 2002-357408 | 12/2002 |

* cited by examiner

*Primary Examiner*—Thanh X. Luu
*Assistant Examiner*—Tony Ko
(74) *Attorney, Agent, or Firm*—Wenderoth, Lind & Ponack, L.L.P.

(57) ABSTRACT

A piston-ring inspecting device includes a sensor unit (27) including a light emitting system (27a) that emits slit-like detection light toward an outer peripheral surface (Ps) of a piston (P) and an outer peripheral surface (2c) of a piston ring (2) and a light receiving image system (27b) that receives light reflected from the outer peripheral surfaces so as to form an image; an image calculating means that subjects image information obtained by the sensor unit to numerical processing and that calculates a tilt angle of the outer peripheral surface of the piston ring with respect to the outer peripheral surface of the piston; and a controller (30) including a judgment means that, based on arithmetical information obtained by the image calculating means and preset standard information, judges whether or not the piston ring has been fitted in a predetermined direction. Accordingly, an inspection can be performed without scanning, through a simple analysis process, in a short time, and with high accuracy.

6 Claims, 10 Drawing Sheets

DEVICE AND METHOD FOR INSPECTING PISTON RING

TECHNICAL FIELD

The present invention relates to a piston-ring inspecting device and method for inspecting whether a piston ring has been fitted around a piston of an internal combustion engine while correctly directing the front and the back of the piston ring.

BACKGROUND ART

Generally, a piston P that reciprocates in a cylinder bore of an internal combustion engine has three ring grooves Pg as shown in FIG. 1. Two compression rings 1 and 2 used to prevent the blow-by of a combustion gas and an oil ring 3 used to adjust a lubricant film are fitted in these ring grooves Pg. One of the two compression rings is a first ring 1 that chiefly seals the combustion gas, and the other is a second ring 2 that seals the combustion gas and adjusts the lubricant film. A connecting rod R is swingably connected to the piston P.

Generally, a tapered-face type ring whose outer peripheral surface is inclined is employed as the second ring 2. For example, if an end face 2a thereof directed toward an upper surface Pu of the piston P is defined as a front face, and an end face 2b thereof directed toward a lower surface of the piston P is defined as a back face in a state of being correctly fitted around the piston P, the outer peripheral surface 2c of the second ring is formed to have a tapered shape (a truncated-cone shape) in which the outer diameter of an edge on the front face side becomes smaller, whereas the outer diameter of an edge on the back face side becomes greater.

Therefore, the second ring 2 is required to be correctly fitted into the ring groove Pg of the piston P so as not to allow the inclination direction of the outer peripheral surface 2c to become opposite, i.e., so as not to incorrectly set the front and the back of the second ring 2.

Therefore, in order to inspect whether or not this piston ring (the second ring 2) has been fitted around the piston P in a correct direction, a conventional technique has been carried out such that a laser sensor that measures a distance by use of spot-like detection light is allowed to scan the outer peripheral surface of the piston P, and measurement data obtained by the laser sensor and positional data of the laser sensor are analyzed and processed by dedicated software so as to calculate the shape of the outer peripheral surface of the second ring 2, and, based on the calculation result, the front and the back of the second ring are judged.

However, in the conventional technique, the measurement data of the laser sensor and the positional data of the laser sensor must be analyzed while being synchronized, and a device, such as an encoder, to obtain positional data is needed. Additionally, complex analysis software, or the like, used to calculate the shape of the ring from the measurement data and the positional data is needed. Still additionally, in order to scan the outer peripheral surface of the piston P, the laser sensor or the piston is required to be relatively moved, and hence there is a fear that an error will occur in the measurement data because of vibrations or shakes caused by the movement of the laser sensor or the piston.

A known conventional laser sensor measures the outline and the like of an object by using slit light (detection light) whose cross-section is linear (see Japanese Unexamined Patent Publication No. 2002-357408, for example). However, the laser sensor disclosed in this publication can measure the outline of the object, but cannot automatically judge whether it is OK or NG based on, for example, its measurement data. Additionally, in this laser sensor, a measuring range cannot be easily and freely selected based on, for example, an obtained image, and hence wasteful time is consumed in measurement.

The present invention has been made in consideration of the foregoing circumstances of the conventional technique. It is therefore an object of the present invention to provide a piston-ring inspecting device and method capable of measuring and approximating the shape of the outer peripheral surface of a piston ring in a short time and with high accuracy through a simple analysis process without needing a relative movement (scanning) of a piston and a sensor and capable of judging whether or not the piston ring has been fitted around the piston in a correct direction.

DISCLOSURE OF INVENTION

The piston-ring inspecting device of the present invention that achieves the above object includes a sensor unit including a light emitting system that emits slit-like detection light toward an outer peripheral surface of a piston and an outer peripheral surface of a piston ring in a state in which the piston ring whose outer peripheral surface has directionality has been fitted around the piston and a light receiving image system that receives light reflected from the outer peripheral surfaces so as to form an image; an image calculating means for subjecting image information obtained by the sensor unit to numerical processing and calculating a tilt angle of the outer peripheral surface of the piston ring with respect to the outer peripheral surface of the piston; and a judgment means for, based on arithmetical information obtained by the image calculating means and preset standard information, judging whether or not the piston ring has been fitted in a predetermined direction.

According to this structure, slit-like light emitted from the light emitting system of the sensor unit toward the outer peripheral surface of the piston and the outer peripheral surface of the piston ring in a state in which the piston ring has been fitted around the piston is reflected from the outer peripheral surfaces, then enters the light receiving image system, and forms an image. Information about the image is subjected to numerical processing by the image calculating means, and a tilt angle of the outer peripheral surface of the piston ring with respect to the outer peripheral surface of the piston is calculated. Thereafter, the judgment means makes a comparison between the arithmetical information and the standard information, and judges whether or not the front and the back of the piston ring have been set in a predetermined direction, i.e., whether or not the piston ring has been correctly fitted.

Thus, the state of the piston ring fitted around the piston can be detected (the state of the front and the back of the piston ring can be detected) by subjecting the image information to numerical processing and making a simple comparison judgment. Therefore, an inspection can be performed without scanning, through a simple analysis process, in a short time, and with high accuracy.

Preferably, in the aforementioned structure, the image calculating means may linearly approximate a reference image based on the outer peripheral surface of the piston and an inclination image based on the outer peripheral surface of the piston ring, and calculates an angle between obtained approximate straight lines.

According to this structure, reference image concerning the outer peripheral surface of the piston and inclination information concerning the outer peripheral surface of the piston ring are linearly approximated and simplified, and a relative angle between the approximate straight lines is calculated, whereby the inclination direction of the outer peripheral surface of the piston ring is detected. The linear approximation makes the analysis process simple and makes the processing time short.

Preferably, in the aforementioned structure, the image calculating means may select a predetermined range apart from both ends of the reference image and a predetermined range apart from both ends of the inclination image, and linearly approximate the selected ranges.

According to this structure, since the neighborhood of both ends of the reference and inclination images is an unstable area where an error is liable to occur in image data, an errorless, highly accurate inspection can be performed by selecting middle ranges excluding this area and by a linear approximation.

Preferably, in the aforementioned structure, the inspecting device may further include an image information display means for displaying image information obtained by the sensor unit so that the image information can be visually confirmed and a selection means for, based on the image information displayed by the image information display means, selecting the predetermined ranges to be linearly approximated.

According to this structure, a range to be linearly approximated can be selected by the selection means while visually confirming obtained image information through the image information display means. Therefore, a range to be linearly approximated can be easily set.

The piston-ring inspecting method of the present invention that achieves the above object includes an imaging step of emitting slit-like detection light toward an outer peripheral surface of a piston and an outer peripheral surface of a piston ring in a state in which the piston ring whose outer peripheral surface has directionality has been fitted around the piston and receiving light reflected from the outer peripheral surfaces so as to form an image; an image calculating step of subjecting image information obtained by the imaging step to numerical processing and calculating a tilt angle of the outer peripheral surface of the piston ring with respect to the outer peripheral surface of the piston; and a judgment step of, based on arithmetical information obtained by the image calculating step and preset standard information, judging whether or not the piston ring has been fitted in a predetermined direction.

According to this structure, slit-like light emitted from the light emitting system of the sensor unit toward the outer peripheral surface of the piston and the outer peripheral surface of the piston ring in a state in which the piston ring has been fitted around the piston is reflected from the outer peripheral surfaces, then enters the light receiving image system, and forms an image. Information about the image is subjected to numerical processing, and a tilt angle of the outer peripheral surface of the piston ring with respect to the outer peripheral surface of the piston is calculated. A comparison is then made between the arithmetical information and the standard information, and a judgment is made of whether or not the front and the back of the piston ring have been set in a predetermined direction, i.e., whether or not the piston ring has been correctly fitted.

Since the fitted state of the piston ring (the front-back state of the piston ring) can be detected by subjecting the image information to numerical processing and by making a simple comparative judgment in this way, an inspection can be performed without scanning, through a simple analysis process, in a short time, and with high accuracy.

Preferably, in the aforementioned inspecting method, the imaging step may be carried out after the piston is vertically suspended while holding a connecting rod and after an outer periphery of the piston and an outer periphery of the piston ring are firmly grasped.

According to this structure, after the piston is suspended downwardly in the vertical direction and is fixed, sensing by the sensor unit and the other operations are performed. Hence, the setting of the piston can be easily performed, and a time needed for the inspecting step can be shortened.

BEST MODE FOR CARRYING OUT THE INVENTION

An embodiment of the present invention will be hereinafter described with reference to the attached drawings.

Figure 2:
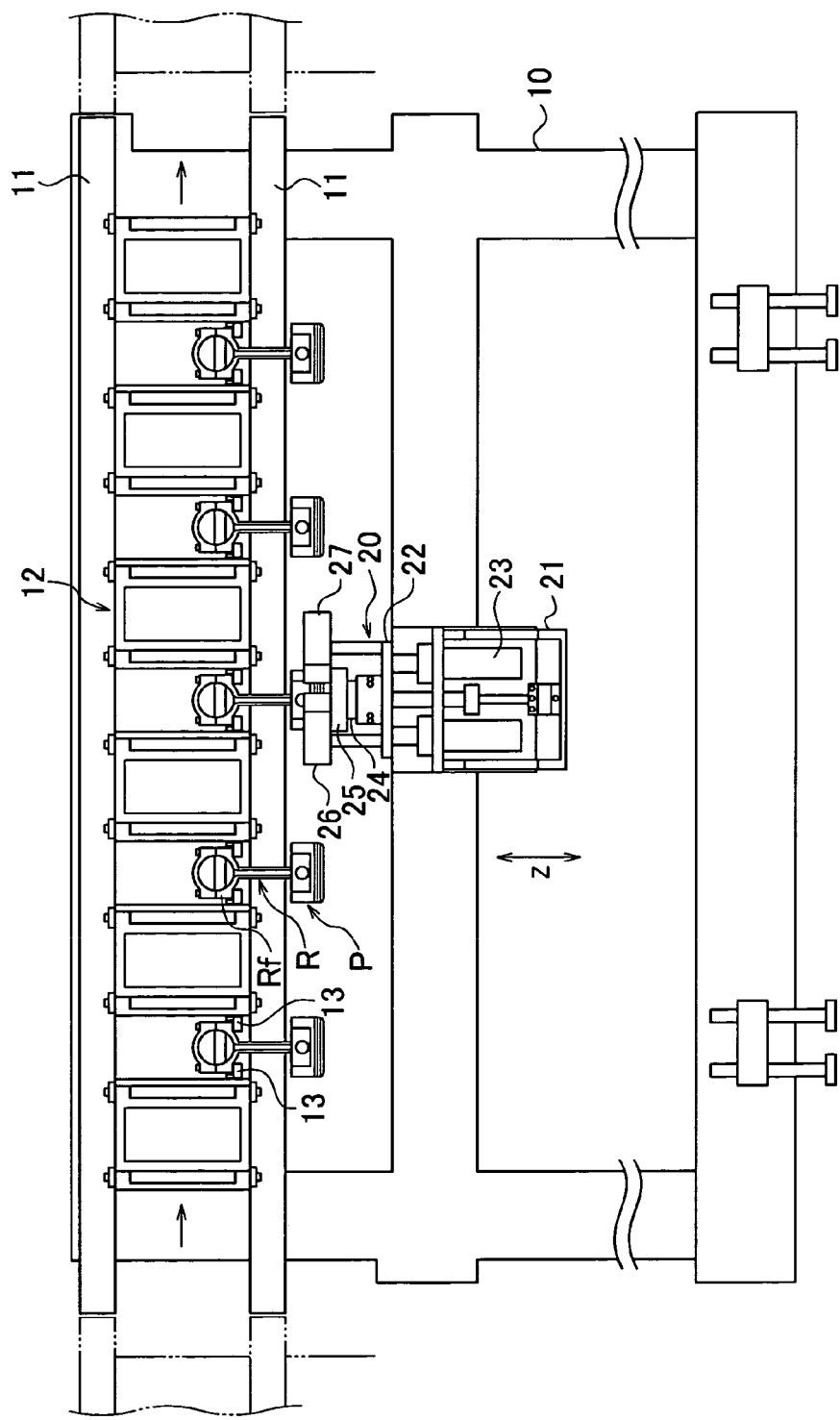
FIG. 2 is a front view of a piston-ring inspecting device according to the present invention.
Figure 3:
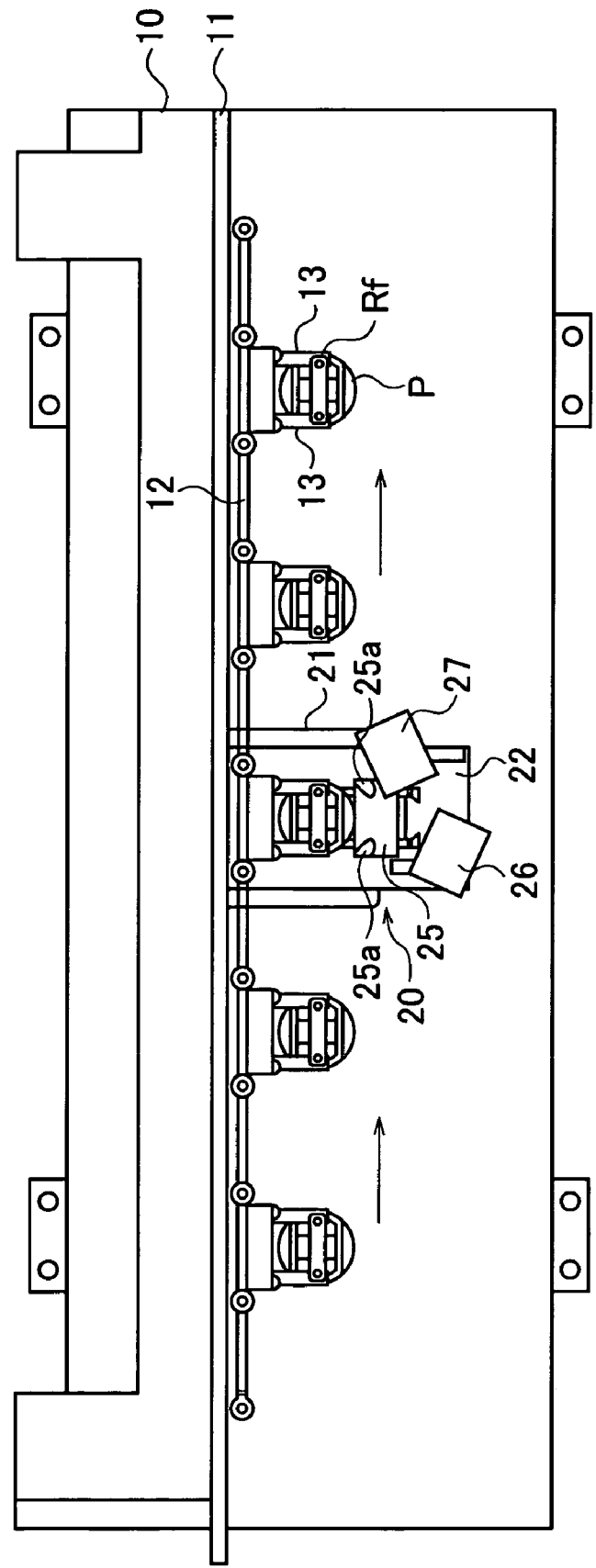
FIG. 3 is a plan view of the piston-ring inspecting device according to the present invention.
Figure 4:
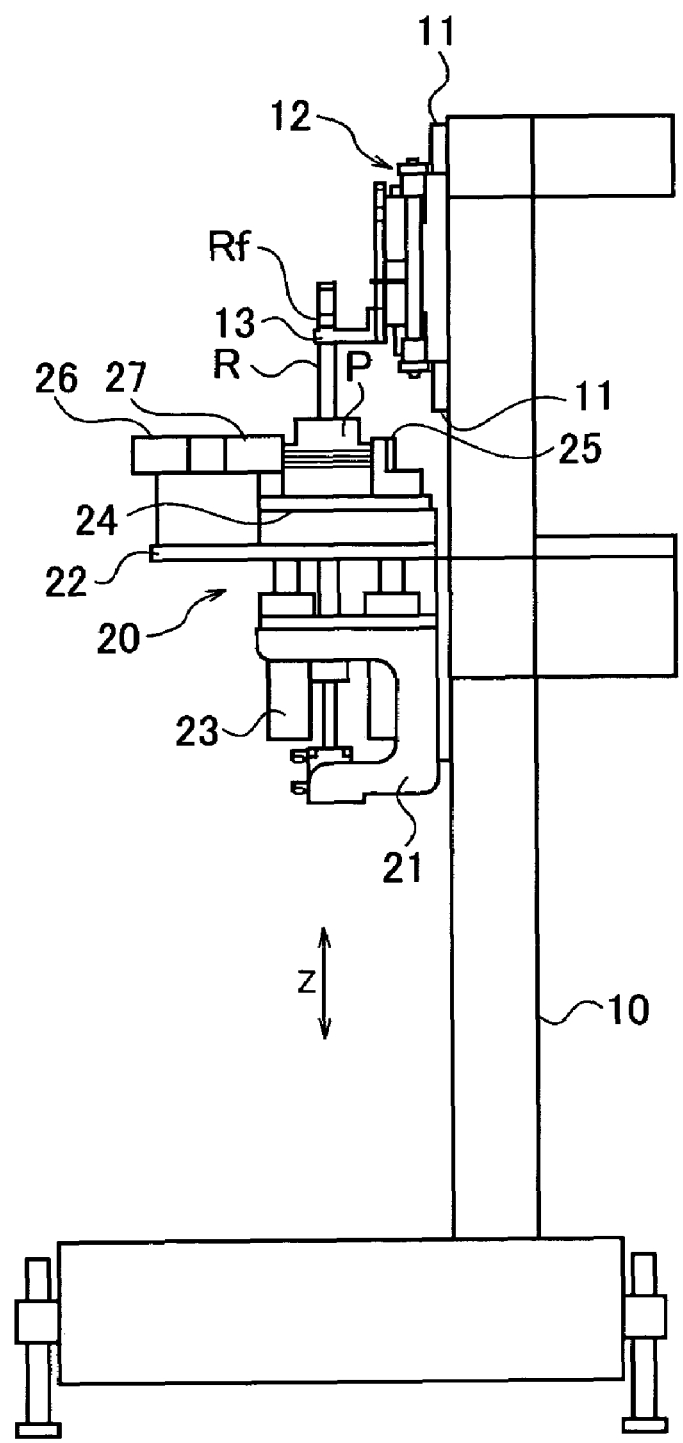
FIG. 4 is a side view of the piston-ring inspecting device according to the present invention.

As shown in FIG. 2 to FIG. 4, a piston-ring inspecting device includes a frame 10, a guide rail 11 provided at the upper part of the frame 10 and extending horizontally, a conveyor 12 guided along the guide rail 11, and a detection unit 20 disposed substantially at the center of the frame 10.

Figure 5:
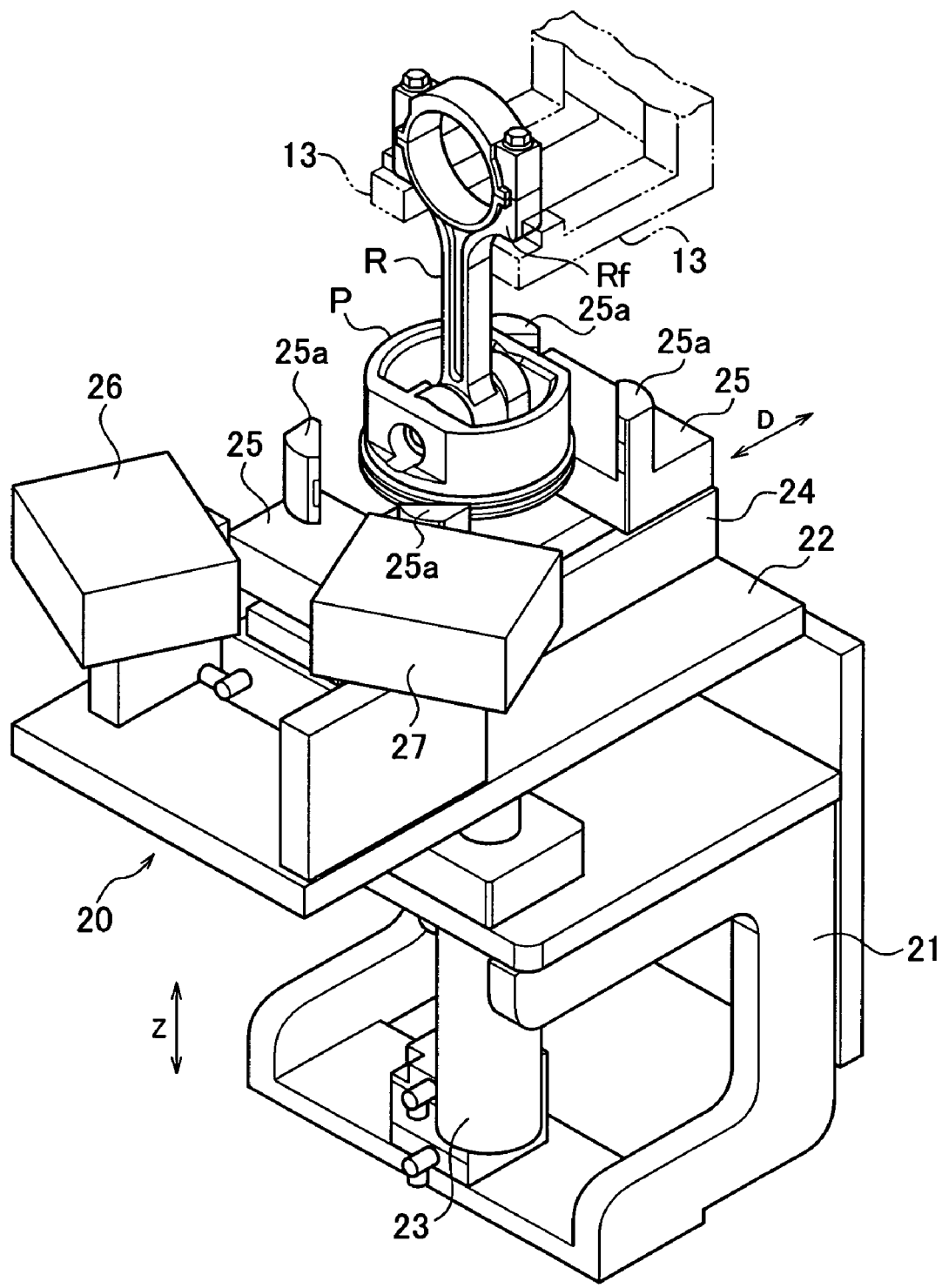
FIG. 5 is an enlarged perspective view of a part of the device according to the present invention.

The conveyor 12 is used to carry a piston P to which a connecting rod R is connected in from a processing step, which is performed on the upstream side in the flow of a sequence of operations, to this inspecting step, and successively carry the piston P out to a processing step performed on the downstream side after the completion of the inspecting step. As shown in FIG. 2, FIG. 3, and FIG. 5, the conveyor 12 has a plurality of pairs of holding arms 13 spaced with predetermined intervals, in order to position and hold flange parts Rf of the connecting rod R.

Figure 1:
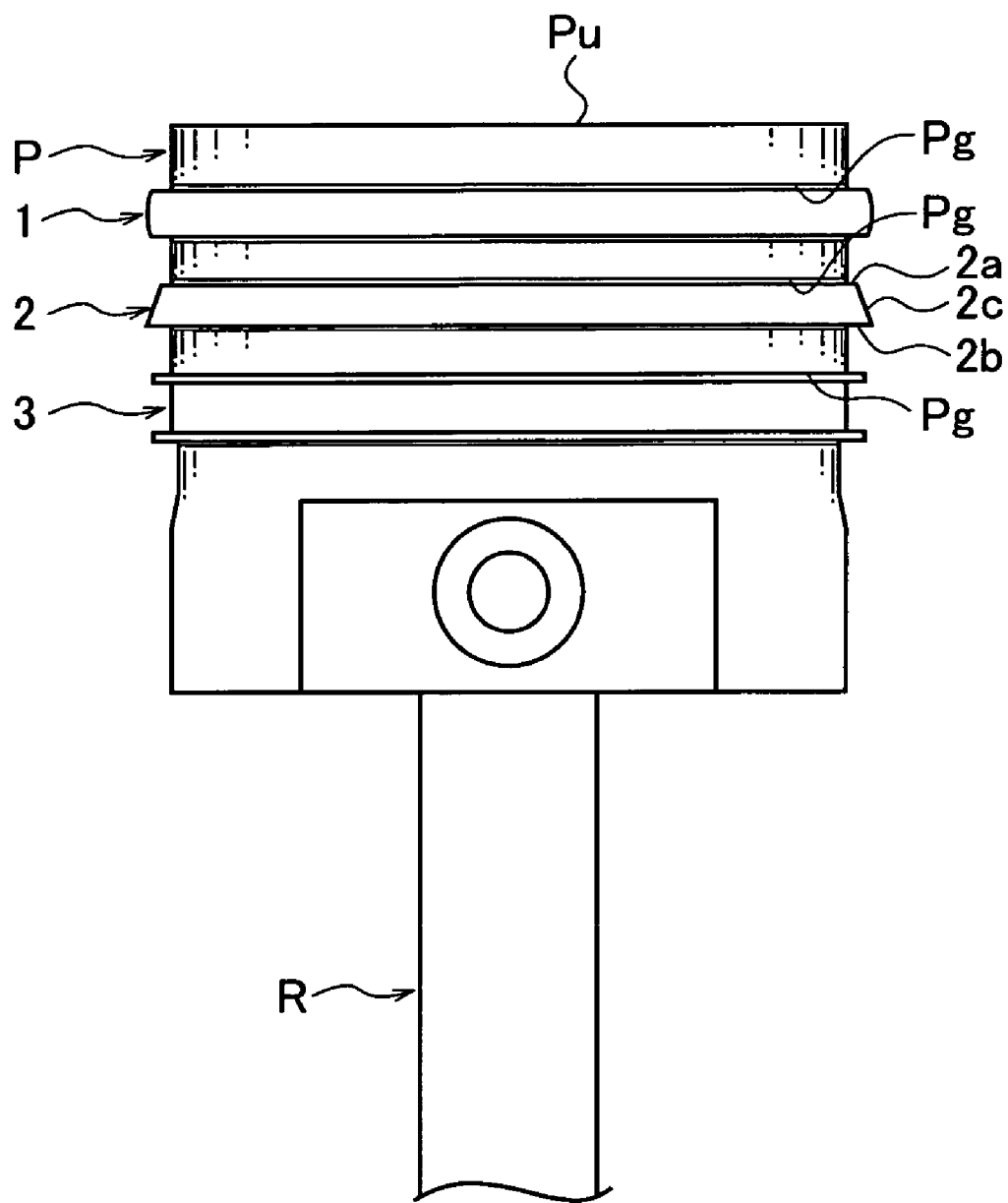
FIG. 1 is a side view showing a state in which a plurality of piston rings are fitted around a piston.

As shown in FIG. 2, FIG. 4, and FIG. 5, the pair of holding arms 13 support and position the flange parts Rf of the connecting rod R from below outside the flange parts Rf, and hold the piston P in a state in which the piston P is suspended downwardly in the vertical direction (Z direction). Since the piston P is suspended and supported in this way, the piston P becomes horizontal under its own weight, and piston rings (a first ring 1, a second ring 2, and an oil ring 3 shown in FIG. 1) fitted in ring grooves of the piston P also become horizontal. The piston P (and the connecting rod R) is loaded on and unloaded from the pair of holding arms 13 by means of transfer devices disposed on the upstream side and on the downstream side, respectively.

As shown in FIG. 2 to FIG. 5, the inspection unit 20 is made up of a base 21 fixed to the frame 10, a table 22 supported movably up and down in a vertical direction with respect to the base 21, a driving mechanism 23 that drives the table 22 upwardly and downwardly, a guide 24 extending in forward and backward directions D (see FIG. 5) on the table 22, a pair of movable members 25 reciprocated so as to proceed to and recede from each other along the guide 24, two grasping pieces 25a (four in total) protruding from each of the movable members 25 upwardly, a driving mechanism (not shown) that drives the pair of movable members 25, a sensor unit 26 that inspects whether or not the first ring 1, the second ring 2, and the oil ring 3 have been attached (i.e., inspects the presence or absence of the rings), a sensor unit 27 that inspects whether or not the second ring 2 has been fitted in a predetermined direction (i.e., whether or not the front and back of the second ring 2 have been set in a correct direction), and a sensor (not shown) that detects a standby position and a fixed position (grasped position) of the movable members 25.

Figure 6:
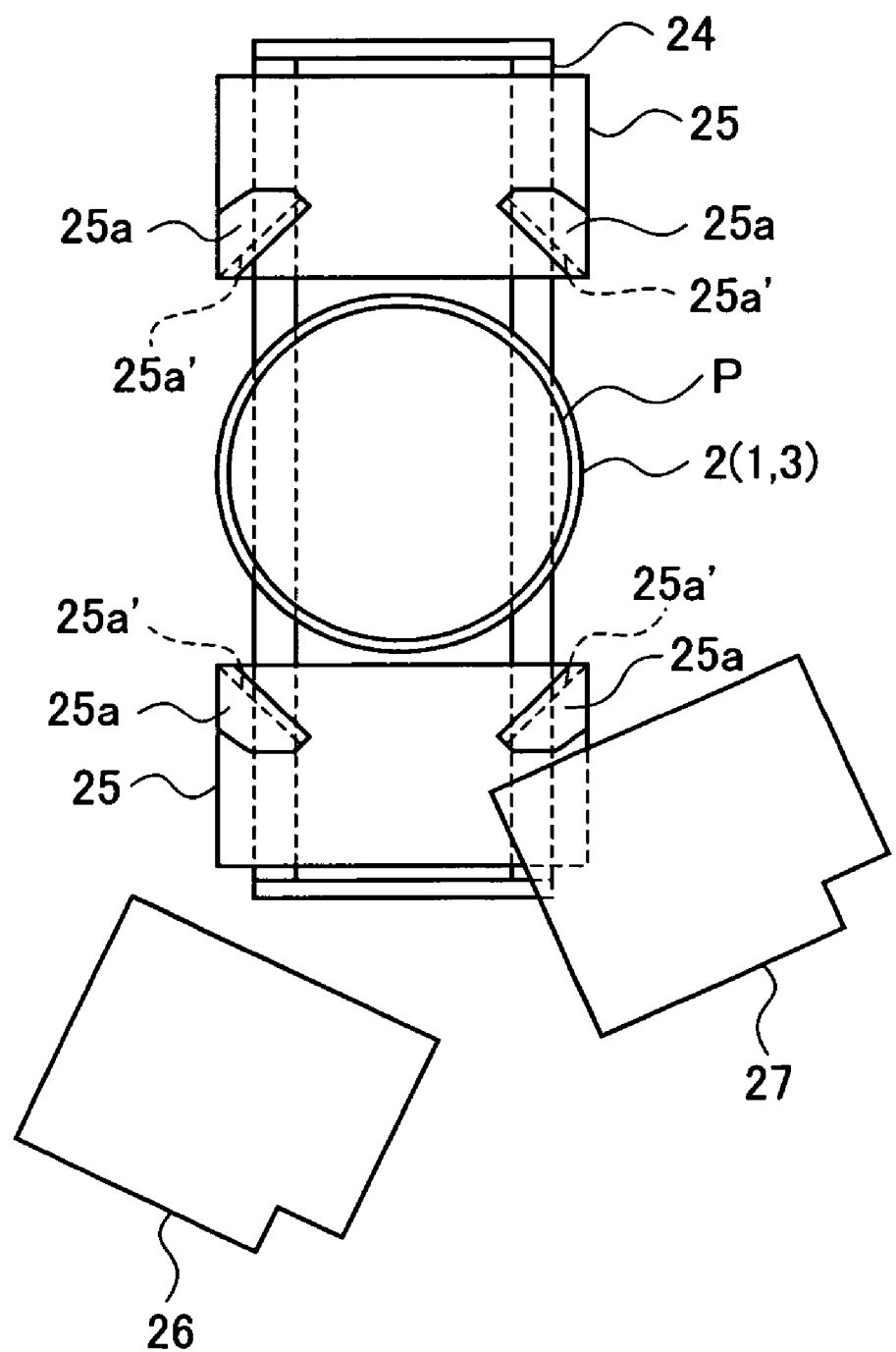
FIG. 6 is a plan view showing a state in which the piston and the piston rings have not yet been positioned.

As shown in FIG. 5 and FIG. 6, in the standby position, the pair of movable members 25 are positioned apart from the piston P and the piston rings (the first ring 1, the second ring 2, and the oil ring 3).

Figure 7:
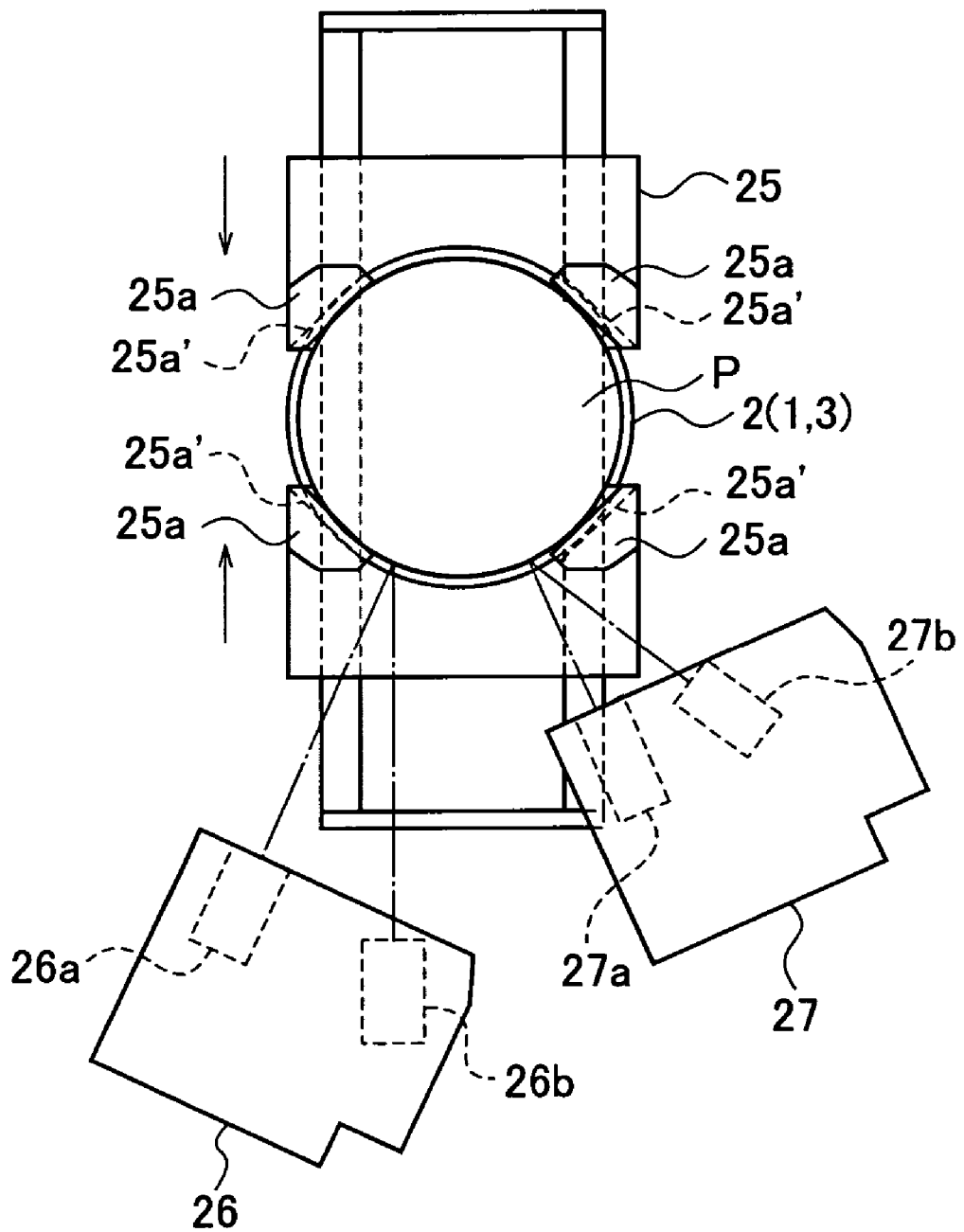
FIG. 7 is a plan view showing a state in which the piston and the piston rings have been tightly held and fixedly positioned.

On the other hand, in the fixed position (grasped position), the pair of movable members 25 are brought close to each other along the guide 24 as shown in FIG. 7. The pair of movable members 25 position (center) the piston P while firmly grasping the outer peripheral surface Ps of the piston P with the side face of the grasping piece 25a, and position (center) the three piston rings (1, 2, 3) while holding the piston rings with a groove part 25a' formed in the side face of the grasping piece 25a and reducing the diameter of each of the rings by a predetermined amount.

With respect to pistons (and connecting rods) with different specifications, the table 22 is driven in the vertical direction (Z direction) by the driving mechanism 23, and is adjusted (positioned) at preset desired heights (a plurality of height positions corresponding to the specifications of the pistons).

The sensor unit 26 is to simultaneously inspect the presence or absence of the first ring 1, the second ring 2, and the oil ring 3, and, as shown in FIG. 7, includes a light emitting system 26a that emits detection light whose cross-section is like a slit (line) toward the outer peripheral surface Ps of the piston P and the outer peripheral surfaces of the first ring 1, the second ring 2, and the oil ring 3 and a light receiving image system 26b that receives light reflected from the outer peripheral surfaces so as to form an image.

For example, if the information that the area of ring grooves, which are formed in the outer peripheral surface Ps of the piston P and which correspond to the piston rings 1, 2, and 3, is convex is obtained from an obtained image by a controller 30 described later and other elements, it is judged that the piston rings 1, 2, and 3 have been fitted (i.e., the piston rings are present). On the other hand, if the information that the area of the ring grooves corresponding to the piston rings 1, 2, and 3, is concave is obtained, it is judged that the piston rings 1, 2, and 3 have not yet been fitted (i.e., the piston rings are absent).

The sensor unit 26 is not limited to the one that detects the presence or absence of the piston rings by the image processing mentioned above. The presence or absence of each of the piston rings 1, 2, and 3 may be detected by whether or not detection light has been intercepted merely by use of, for example, a transmission type optical sensor.

Figure 8:
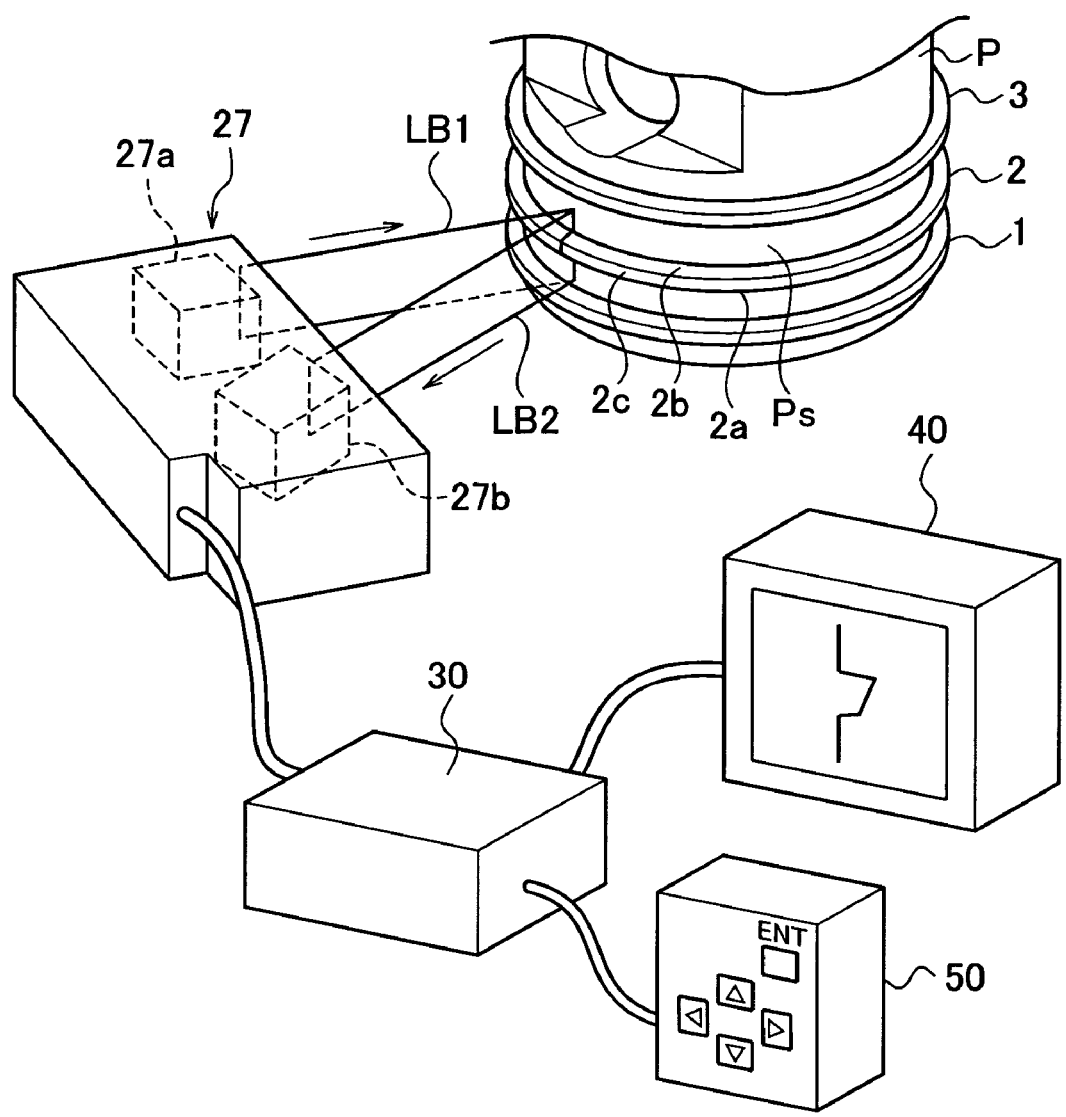
FIG. 8 is a system view of the piston-ring inspecting device according to the present invention.

The sensor unit 27 is to inspect whether or not the second ring 2 has been fitted in a correct direction (i.e., whether or not the front and the back of the second ring 2 have been set in a predetermined direction). As shown in FIG. 7 and FIG. 8, the sensor unit 27 includes a light emitting system 27a that emits detection light whose cross-section is like a slit (like a line) toward the outer peripheral surface Ps of the piston P and the outer peripheral surface 2c of the second ring 2 and a light receiving image system 27b that receives light reflected from the outer peripheral surfaces Ps and 2c so as to form an image.

The light emitting system 27a includes a semiconductor laser that emits a laser beam, a drive circuit that drives the semiconductor laser, and a light emitting lens. The light receiving image system 27b includes a light receiving lens that receives reflected light and an image pickup element such as a CCD that picks up light of a photographic subject passing through the light receiving lens and forms an image of the photographic subject. In more detail, as shown in FIG. 8, detection light LB1 is first emitted (projected) from the light emitting system 27a toward the outer peripheral surfaces Ps and 2c, and reflected light LB2 from the outer peripheral surfaces Ps and 2c is then received by the light receiving image system 27b, and is imaged by the image pickup element in two-dimensional form.

Since the sensor unit 27 must accurately detect whether the contour line of the piston ring is inclined in an upward or downward direction as well as information about a convex or concave state, the sensor unit 27 is disposed closer to the piston P than the sensor unit 26 as shown in FIG. 6 and FIG. 7, so that the sensor unit 27 can detect the piston rings with higher accuracy.

As shown in FIG. 8, a controller 30 that exercises the entire control by performing various arithmetic processes, a judgment process, etc., is connected to the sensor unit 27. A monitor 40 serving as an image information display means for displaying image information obtained by the sensor unit 27, an operation unit 50 including a cursor key and an enter key serving as a selection means for selecting the processing range of a two-dimensional image by moving a cursor on the image displayed on the monitor 40, a sequencer (not shown) that controllably drives the device based on a control signal, an operating panel (not shown) that includes a display lamp or a notice lamp that displays or notices various pieces of information, etc., are connected to the controller 30. A keyboard, a mouse, or a joystick connected to a personal computer may be used as the selection means, without being limited to the dedicated device.

The controller 30 includes an A/D converter, a calculating circuit and the like serving as an image calculating means that subjects the image information obtained by the sensor unit 27 to numerical processing, and calculates the tilt angle of the outer peripheral surface 2c of the second ring 2 with respect to the outer peripheral surface Ps of the piston P, and a judgment circuit serving as a judgment means that judges whether or not the second ring 2 has been fitted in a predetermined direction on the basis of arithmetical information obtained by the image calculating means and standard information that is used as a standard for judgment and that is prestored in, for example, a ROM.

Figure 9A:
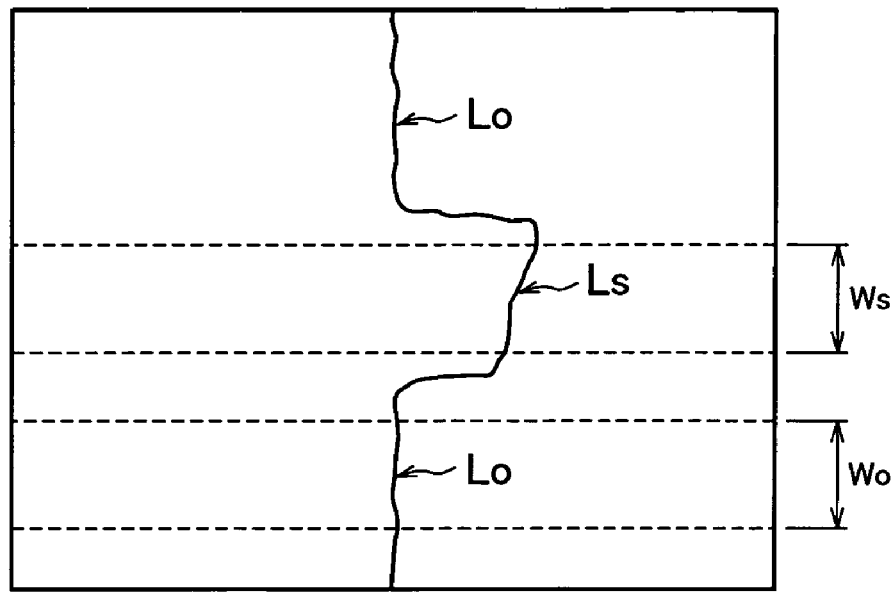
FIG. 9A shows an image displayed on a monitor.

In the arithmetic processing (numerical processing) of the image in the controller 30, an operator first operates the cursor key of the operation unit 50 while watching the display image displayed on the monitor 40, then selects predetermined ranges Ws and Wo with respect to a reference image Lo based on the outer peripheral surface Ps of the piston P and an inclination image Ls based on the outer peripheral surface 2c of the second ring 2, and sets an area to be subjected to arithmetic processing as shown in FIG. 9A.

Middle ranges away from both ends of images Ls and Lo, especially away from the rising and falling areas, are selected as the predetermined ranges Ws and Wo. In other words, since the neighborhood of the ends of the images Ls and Lo including the rising and falling areas is an unstable area where an error is-liable to occur in image data, an errorless, highly accurate inspection can be performed by selecting the middle ranges excluding these areas as ranges used for arithmetic processing.

Figure 9B:
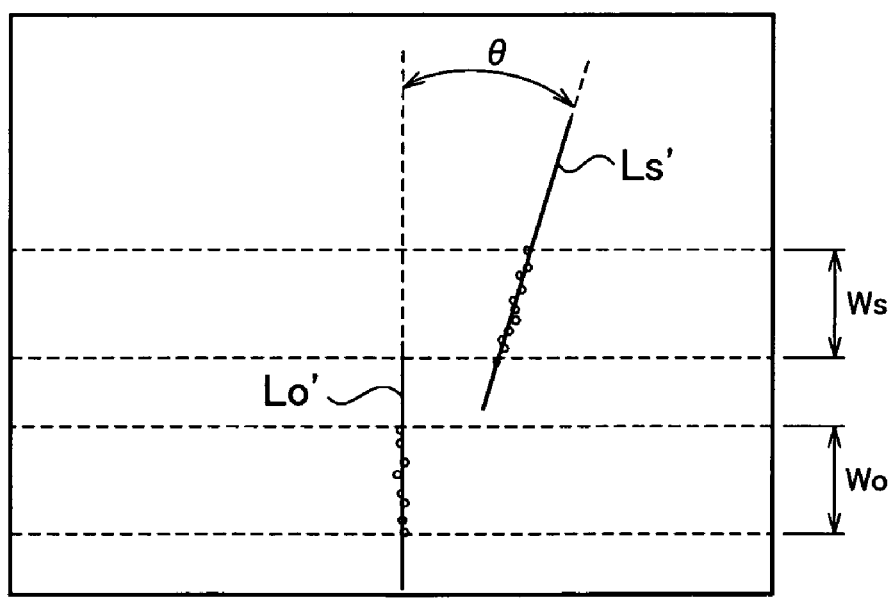
FIG. 9B shows an image that has undergone numerical treatment in a selected range.

The images of the predetermined ranges Ws and Wo selected as described above are linearly approximated according to a least squares method as shown in FIG. 9B, and an angle θ between approximate straight lines Ls' and Lo' obtained thereby is calculated. Since the reference information Lo concerning the outer peripheral surface Ps of the piston P and the inclination information Ls concerning the outer peripheral surface 2c of the second ring 2 are linearly approximated in the selected ranges in this way, the analysis process is simplified, and the processing time is shortened.

Herein, straight-line complementary analysis software prestored in the controller 30 is used to perform the linear approximation. In this software, an arithmetic process is performed such that pieces of image information concerning the selected ranges Ws and Wo are approximated by a straight line expressed by Y=A1·X+Ao (for example, Y=A1·X+Ao about Ls', and Y'=A1'·X+Ao' about Lo'), and a tilt angle θ is calculated from the values A1 and A1' obtained from the image information Ls and Lo, respectively.

In other words, in the selected ranges Ws and Wo, an X-coordinate is set in a direction along the outer peripheral surfaces Ps and 2c, i.e., in the vertical direction (Z direction), and a Y-coordinate is set in a concavo-convex direction. When N X-coordinate values (X1, X2, . . . , . . . , Xn−1, Xn) including both ends are determined as sampling values, Y-coordinate values (Y1, Y2, . . . , . . . , Yn−1, Yn) corresponding to the X coordinates are calculated. Subsequently, the values ΣX, ΣY, ΣX·Y, (ΣX)$^2$−N·(ΣX$^2$), (ΣX)·(ΣY)−N·(ΣX·Y), N·(ΣX$^2$)−(ΣX)$^2$, and (ΣY)·(ΣX$^2$)−(ΣX)−(ΣX·Y) are calculated, and the values A1, Ao (A1', Ao') are calculated.

Arithmetical information (tilt angle θ) is then compared with standard information (tilt angle θo obtained when correctly fitted) by the judgment means (judgment circuit) of the controller 30, and a judgment is made of whether or not the front and the back of the second ring 2 have been set in a predetermined direction, i.e., whether or not the second ring 2 has been correctly fitted.

Since the fitted state of the piston ring (the front-back state of the piston ring) can be detected by subjecting the image information to numerical processing and by making a simple comparison in this way, an inspection can be performed without scanning, through a simple analysis process, in a short time, and with high accuracy.

Figure 10:
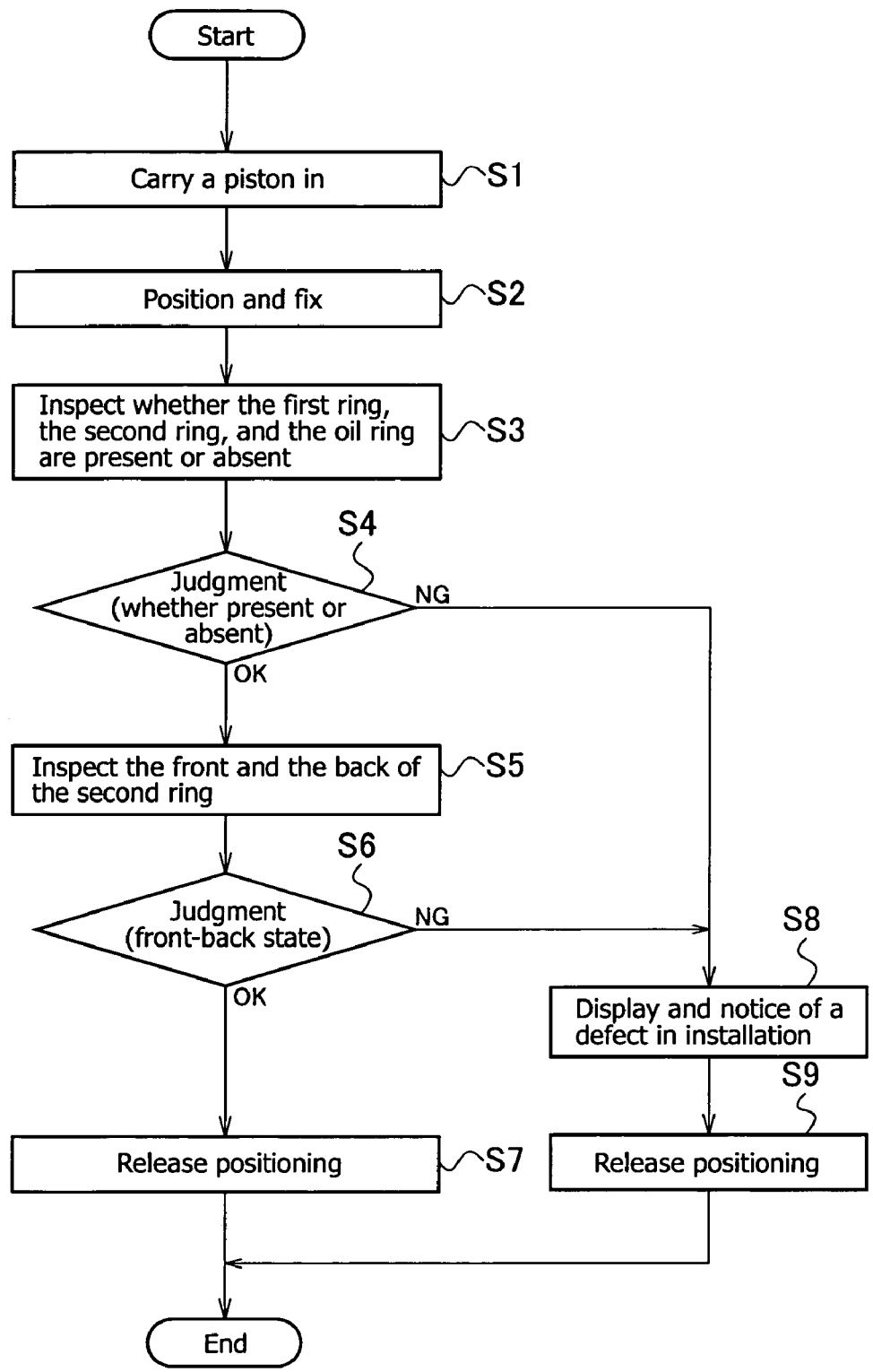
FIG. 10 is a flowchart for explaining the operation of the piston-ring inspecting device.

Referring now to the flowchart of FIG. 10, the operation of the whole of the device will be described. First, the piston P that has undergone the step of installing the piston rings 1, 2, and 3 is carried in by the conveyor 12 in a state of being suspended in the vertical direction (Z direction) (step S1).

When the piston P arrives right above the inspection unit 20, the pair of movable members 25 are driven in directions in which the movable members 25 approach each other. The outer peripheral surface Ps of the piston P and the piston rings (the first ring 1, the second ring 2, and the oil ring 3) are then grasped by the four grasping pieces 25a (25a'), and are fixedly positioned (step S2).

The connecting rod R is supported by the pair of holding arms 13, and the piston P is supported to be suspended by its own weight when the outer peripheral surface Ps of the piston P and the piston rings are fixedly positioned. Therefore, the outer peripheral surface Ps of the piston P and the piston rings are easily positioned (centered).

Thereafter, the sensor unit 26 simultaneously inspects whether or not the first ring 1, the second ring 2, and the oil ring 3 have been fitted (present or absent) (step S3). The controller 30 then judges whether the piston rings are present or absent based on obtained image information (step S4).

If an OK (present) decision is made in step S4, the sensor unit 27 then inspects whether or not the second ring 2 has been fitted in a correct direction (whether or not the front and the back of the second ring 2 have been correctly set) (step S5).

In this inspection process, slit-like detection light is emitted toward the outer peripheral surface Ps of the piston P and the outer peripheral surface 2c of the second ring 2 as described above, and light reflected from the outer peripheral surfaces Ps and 2c is received and imaged (imaging step). The operator then selects a processing range through the operation unit 50 while confirming obtained image information displayed on the monitor 40. Accordingly, a reference image Lo and an inclination image Ls in the selected range are subjected to numerical processing by the controller 30, and are linearly approximated according to the least squares method. Simultaneously, the tilt angle θ of the outer peripheral surface 2c of the second ring 2 with respect to the outer peripheral surface Ps of the piston P is calculated (image calculating step).

On the basis of the obtained arithmetical information (tilt angle θ) and the preset standard information (tilt angle θo when correctly fitted), the controller 30 then judges whether or not the second ring 2 has been fitted in the predetermined direction (judgment step, step S6).

In this judgment process, if the value of angle θ obtained by the calculation falls within a predetermined range including the predetermined angle θo, the second ring 2 is regarded as having been correctly fitted and as OK. If the value of angle θ is outside the predetermined range, the front and the back of the second ring 2 are regarded as having been incorrectly set and as NG. Herein, although the sensor unit 27 inspects whether or not the front and the back of the second ring 2 have been correctly set after the sensor unit 26 completes inspecting whether the rings are present or absent, the presence-absence inspection by the sensor unit 26 and the front-back inspection by the sensor unit 27 may be simultaneously performed.

If an OK decision (i.e., decision that the second ring 2 has been correctly fitted) is made in step S6, the pair of movable members 25 are driven to recede from each other, and are released from the state of being fixedly positioned (step S7), and the inspection of the piston rings 1, 2, and 3 with respect to the piston P is completed. Thereafter, the conveyor 12 is progressively operated, and the piston P that has been inspected is carried out, and, simultaneously, the following piston P is carried in.

On the other hand, if an NG decision (i.e., decision that the piston rings are absent) is made in step S4, or if an NG decision (decision that the front and the back of the second ring 2 have been set in an opposite direction) is made in step S6, the information that the piston rings have been incorrectly fitted is displayed by the display lamp or the notice lamp disposed on the operating panel (step S8).

The pair of movable members 25 are then driven to recede from each other, and are released from the state of being fixedly positioned (step S9), and the inspection of the piston rings 1, 2, and 3 with respect to the piston P is completed. Thereafter, the conveyor 12 is progressively operated, and the piston P that has been inspected is carried out, and, simultaneously, the following piston P is carried in. On the other hand, defective pistons P that have been carried out are moved onto a predetermined recovery pallet by means of a transfer device disposed on the downstream side of the flow of a sequence of operations, and are regathered as defective products.

As described above, in the piston-ring inspecting device, the piston P that has undergone the step of installing the piston rings (the first ring 1, the second ring 2, and the oil ring 3) is continuously carried in, and the inspection unit 20 automatically inspects whether or not the piston rings have been fitted and whether or not the piston rings have been set in a correct direction. Hence, an in-line system can be easily formed in, for example, an automatic assembly line of an internal combustion engine.

Additionally, in this inspection process, the fitted state of the piston rings (the front-back state of the second ring 2) can be detected by subjecting image information to numerical processing and by making a simple comparison. Hence, an inspection can be performed without scanning, through a simple analysis process, in a short time, and with high accuracy.

In the above embodiment, the first ring 1, the second ring 2, and the oil ring 3 that are fitted around the piston P are used as piston rings. However, without being limited to the three piston rings, two or four piston rings maybe fitted around the piston. Additionally, the inspecting device of the present invention can be applied if at least one piston ring, without being limited to the second ring, has directionality on its outer peripheral surface when fitted.

Additionally, in the above embodiment, the second ring 2 whose outer peripheral surface 2c is shaped like a linearly tapered face is used in order to subject an image to numerical processing. However, without being limited to this, if the outer peripheral surface of a piston ring has directionality, a tilt angle in a predetermined range may be calculated by applying numerical processing and approximation processing to its curved surface.

Additionally, in the above embodiment, a method is employed in which the sensor unit 26 first inspects whether the first ring 1, the second ring 2, and the oil ring 3 are present or absent, and then the sensor unit 27 inspects the front and the back of the second ring 2. However, another method converse to the above method may be employed in which the sensor unit 27 first inspects the front and the back of the second ring 2, and then the sensor unit 26 inspects the presence or absence of the first ring 1, the second ring 2, and the oil ring 3.

Additionally, in the above embodiment, the entire inspection is completed without inspecting the front and the back of the second ring 2 if an NG decision is made in the inspection of whether the first ring 1, the second ring 2, and the oil ring 3 are present or absent. However, the entire inspection may be completed after the front and the back of the second ring 2 are inspected in consideration of a case in which the second ring 2 has been fitted.

As described above, according to the piston-ring inspecting device and method of the present invention, in a state in which a piston ring whose outer peripheral surface has directionality has been fitted around a piston, slit-like detection light is emitted toward the outer peripheral surface of the piston and the outer peripheral surface of the piston ring, thereafter light reflected from the outer peripheral surfaces is received and imaged, thereafter information concerning the inclination of the outer peripheral surfaces is calculated by subjecting obtained image information to numerical processing, and a judgment is made of whether or not the piston ring has been set in a predetermined direction based on obtained arithmetical information and preset standard information. Accordingly, the state of the piston ring fitted around the piston (the front and the back of the piston ring) can be detected by a simple comparative judgment. Therefore, an inspection can be performed without scanning with a sensor unlike a conventional technique, through a simple analysis process, in a short time, and with high accuracy.

INDUSTRIAL APPLICABILITY

As described above, the piston-ring inspecting device of the present invention can automatically and easily inspect whether or not the front and the back of a piston ring fitted around a piston of an internal combustion engine have been set in a correct direction. Therefore, the piston-ring inspecting device is useful in, for example, an automatic assembly line of an internal combustion engine.

What is claimed is:

1. A device for inspecting a piston ring, comprising:
   a sensor unit including a light emitting system and a light receiving image system, the light emitting system emitting slit-like detection light toward an outer peripheral surface of a piston and an outer peripheral surface of a piston ring in a state in which the piston ring whose outer peripheral surface has directionality has been fitted around the piston, the light receiving image system receiving light reflected from the outer peripheral surfaces and forming an image;
   an image calculating means for subjecting image information obtained by the sensor unit to numerical processing and calculating a tilt angle of the outer peripheral surface of the piston ring with respect to the outer peripheral surface of the piston; and
   a judgment means for judging whether or not the piston ring has been fitted in a predetermined direction, based on arithmetical information obtained by the image calculating means and preset standard information.

2. The device for inspecting a piston ring as set forth in claim 1, wherein
   the image calculating means linearly approximates a reference image based on the outer peripheral surface of the piston and an inclination image based on the outer peripheral surface of the piston ring, and calculates an angle between obtained approximate straight lines.

3. The device for inspecting a piston ring as set forth in claim 2, wherein
   the image calculating means selects a predetermined range apart from both ends of the reference image and a predetermined range apart from both ends of the inclination image, and linearly approximates the selected ranges.

4. The device for inspecting a piston ring as set forth in claim 3, characterized by further comprising:
- an image display means for displaying image information obtained by the sensor unit so that the image information can be visually confirmed; and
- a selection means for selecting the predetermined ranges to be linearly approximated, based on the image information displayed by the image display means.

5. A method of inspecting a piston ring, comprising:
- an imaging step of emitting slit-like detection light toward an outer peripheral surface of a piston and an outer peripheral surface of a piston ring in a state in which the piston ring whose outer peripheral surface has directionality has been fitted around the piston and receiving light reflected from the outer peripheral surfaces so as to form an image;
- an image calculating step of subjecting image information obtained by the imaging step to numerical processing and calculating a tilt angle of the outer peripheral surface of the piston ring with respect to the outer peripheral surface of the piston; and
- a judgment step of judging whether or not the piston ring has been fitted in a predetermined direction, based on arithmetical information obtained by the image calculating step and preset standard information.

6. The method of inspecting a piston ring as set forth in claim 5, wherein
the imaging step is carried out after the piston is vertically suspended while holding a connecting rod and after an outer periphery of the piston and an outer periphery of the piston ring are firmly grasped.

* * * * *